United States Patent
Samoto et al.

(10) Patent No.: US 7,297,421 B2
(45) Date of Patent: Nov. 20, 2007

(54) EVAPORATION TYPE MAGNETIC RECORDING MEDIUM AND MAGNETIC RECORDING AND REPRODUCING DEVICE

(75) Inventors: Tetsuo Samoto, Miyagi (JP); Takanori Sato, Miyagi (JP); Kazunari Motohashi, Miyagi (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 10/928,294

(22) Filed: Aug. 27, 2004

(65) Prior Publication Data
US 2005/0048326 A1 Mar. 3, 2005

(30) Foreign Application Priority Data
Aug. 29, 2003 (JP) ............................ P2003-305687

(51) Int. Cl.
*G11B 5/66* (2006.01)
*G11B 5/70* (2006.01)
(52) U.S. Cl. ..................................... 428/830
(58) Field of Classification Search ................. 428/830
See application file for complete search history.

(56) References Cited

U.S. PATENT DOCUMENTS 5,453,886 A * 9/1995 Kobayashi et al. ........... 360/46
2003/0224210 A1* 12/2003 Harasawa et al. ....... 428/694 B

FOREIGN PATENT DOCUMENTS

| JP | 3 178028 | 8/1991 |
| JP | 10 198940 | 7/1998 |
| JP | 11 328645 | 11/1999 |

* cited by examiner

*Primary Examiner*—Holly Rickman
(74) *Attorney, Agent, or Firm*—Frommer Lawrence & Haug LLP; William S. Frommer; Paul A. Levy

(57) ABSTRACT

A lower magnetic layer magnetized and formed in a first direction and an upper magnetic layer magnetized and formed in a second direction opposite to the lower magnetic layer are laminated on a base. A ratio $T_1/T_2$ of a thickness $T_1$ of the upper magnetic layer to a thickness $T_2$ of the lower magnetic layer is located within a range of 0.6 to 0.9. Thus, in a herringbone type dual evaporated tape in which data is recorded and reproduced in a serpentine fashion, a vertical magnetization component is canceled to reduce the difference in the waveform distortion of a reproducing signal between a forward direction and a reverse direction.

4 Claims, 3 Drawing Sheets

RATIO OF THICKNESS OF UPPER LAYER TO THE THICKNESS OF LOWER LAYER

RATIO OF THICKNESS OF UPPER LAYER TO THE THICKNESS OF LOWER LAYER

EVAPORATION TYPE MAGNETIC RECORDING MEDIUM AND MAGNETIC RECORDING AND REPRODUCING DEVICE

BACKGROUND OF THE INVENTION

1. Field of the Invention

The present invention relates to an evaporation type magnetic recording medium in which data is recorded and reproduced in a serpentine fashion and a magnetic recording and reproducing device for recording and reproducing data on the medium.

2. Description of the Related Art

In recent years, as an amount of data dynamically increases, the capacity of a tape storage system has urgently needed to be increased. In order to realize the increase of the capacity of the tape storage system, a recording density is requested to be improved. Under these circumstances, in what is called a linear type magnetic recording tape system, it has been difficult for a currently used particulate type tape to more improve the recording density. Accordingly, the use of an evaporated tape in future has been investigated. In the linear type system, since the data is recorded and reproduced in the serpentine fashion as described above, when the evaporated tape is used therefor, the directivity of the evaporated tape causes a problem.

In the evaporated tape usually employed in a non-tracking (NT) type digital tape recorder, since a forward and reverse directivity is desired to be low in electromagnetic conversion characteristics, an oblique evaporation layer has a two reverse layer structure as disclosed in patent documents such as Japanese patent Application Laid-Open No. hei 5-182168, Japanese patent Application Laid-Open No. hei 4-353621 and Japanese Patent Application Laid-open No. hei 4-353622. However, under the usual recording density, an inductive MIG (metal in gap) head has been used as a reproducing head. Therefore, in the evaporated tape used therefor, the entire thickness of a magnetic layer is large as thick as 200 nm. Further, the surface property of the tape has been rough and a spacing between the head and the tape has been large.

On the other hand, in a magnetic recording system aiming at a current high recording density, an AMR head (anisotropic magnetoresistive effect head) is used and the thickness of the magnetic layer of a tape is decreased to about ⅓ as thick as a usual thickness. Further, the surface property of the tape is improved and a spacing between the head and the tape is decreased. Accordingly, there is a risk that the design of the thickness of the magnetic layer is different from the usual design of the thickness of the magnetic layer.

In order to improve the recording density in future as described above, the use of a GMR head (giant magnetoresistive effect head), a TMR head (tunneling magnetoresistive effect head), etc. may be thought out from the current AMR head as the reproducing head. However, since a medium to be used therefor is thinner than that for the AMR head, the optimum film forming ratio of the herringbone type dual evaporated layer is more important.

SUMMARY OF THE INVENTION

The present invention is proposed by taking the above-described problems into consideration and it is an object of the present invention to provide an evaporation type magnetic recording medium in which the ratio thickness of an upper magnetic layer and a lower magnetic layer of a herringbone type dual evaporated tape used for a linear type tape system using an MR head and having a surface recording density exceptionally improved is specified to a ratio for canceling a vertical magnetization component, and a magnetic recording and reproducing device.

To achieve the above-described object, in an evaporation type magnetic recording medium according to the present invention, data is recorded and reproduced in a serpentine fashion. The evaporation type magnetic recording medium comprises: a supporter; a first magnetic layer magnetized and formed in a first direction and a second magnetic layer magnetized and formed in a second direction opposite to the first direction. The first magnetic layer and the second magnetic layer are laminated on the supporter. A ratio $T_1/T_2$ of a thickness $T_1$ of the first magnetic layer to a thickness $T_2$ of the second magnetic layer is located within a range of 0.6 to 0.9.

Further, the evaporation type magnetic recording medium wherein at least one of the first magnetic layer and the second magnetic layer is composed of a plurality of magnetic layers.

Further, a magnetic recording and reproducing device according to the present invention having a signal processing means of one system wherein a signal of the above-described evaporation type magnetic recording medium is reproduced by using a magnetoresistive effect head.

Still further, a magnetic recording and reproducing device having a signal processing means of one system wherein a signal of the evaporation type magnetic recording medium is reproduced by using a magnetoresistive effect head.

In the evaporation type magnetic recording medium according to the present invention, a vertical magnetization component is canceled and the difference of a signal waveform distortion between forward and reverse directions is canceled. Thus, the same or substantially the same reproduced waveform can be obtained in the forward direction and the reverse direction.

In the magnetic recording and reproducing device according to the present invention, a process can be performed by the signal processing means of one system common to the forward and reverse directions without using signal processing means of two systems in the forward and reverse directions. Accordingly, a signal processing system can be simplified and an inexpensive recording and reproducing system can be realized.

Furthermore, according to the present invention, since the signal on the evaporation type magnetic recording medium in which the ratio $T_1/T_2$ of the thickness of the first magnetic layer to the thickness of the second magnetic layer is located within a range of 0.6 to 0.9 is reproduced by using the magnetoresistive effect head, a surface recording density is more extremely improved than the usual device using the inductive metal in gap head.

DETAILED DESCRIPTION OF THE PREFERRED EMBODIMENTS

Figure 1:
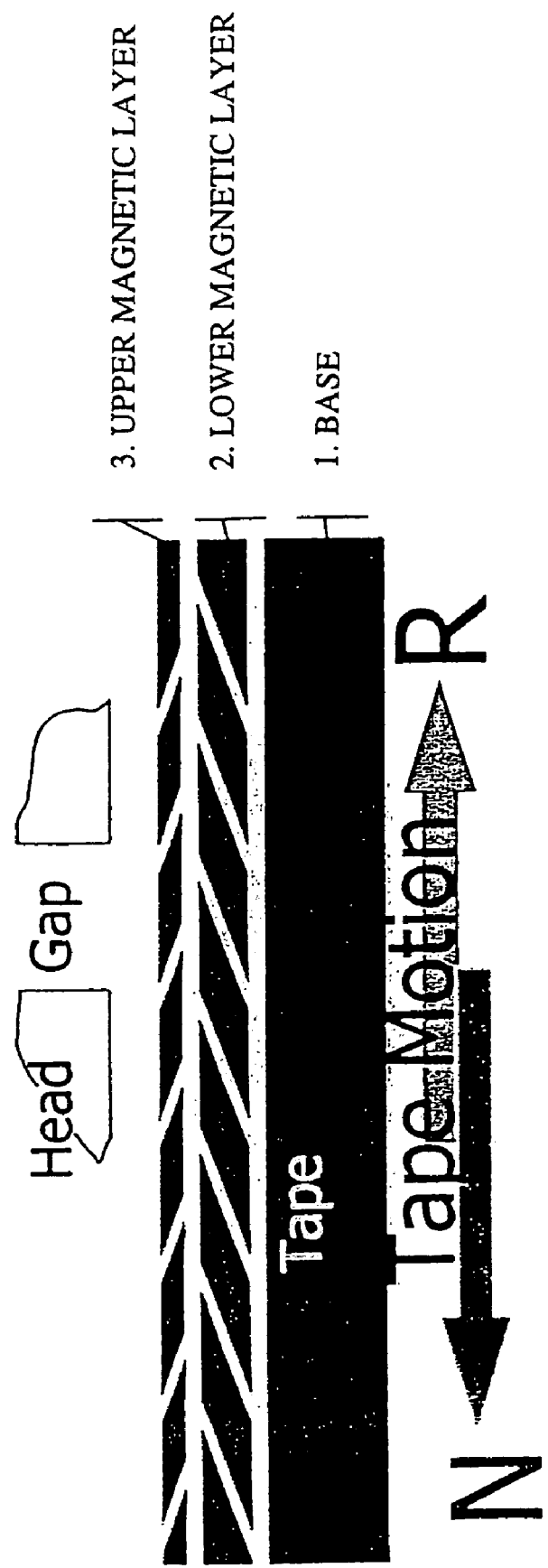
FIG. 1 is a sectional block diagram showing one example of a herringbone type dual evaporated tape to which the present invention is applied.

Now, referring to the drawings, one embodiment of the present invention will be described in detail. FIG. 1 shows a structural example of an evaporated tape (a magnetic recording medium) to which the present invention is applied. Reference numeral 1 designates a base (a non-magnetic supporter) composed of a material, for instance, PET (polyethylene terephthalate), PEN (polyethylene naphthalate), alamide, etc.

On one end face of the base 1, a lower magnetic layer 2 and an upper magnetic layer 3 are formed with Co based metal by an evaporation method or the like. The directions of the columns of the magnetic layers (magnetizing directions) are set so that the right and left directions are reverse to each other between the upper and lower layers. In order to adjust an amount for canceling the characteristic difference due to the forward and reverse traveling directions of the evaporated tape, the thickness of the upper magnetic layer and the thickness of the lower magnetic layer were respectively examined by a method described below.

Figure 2:
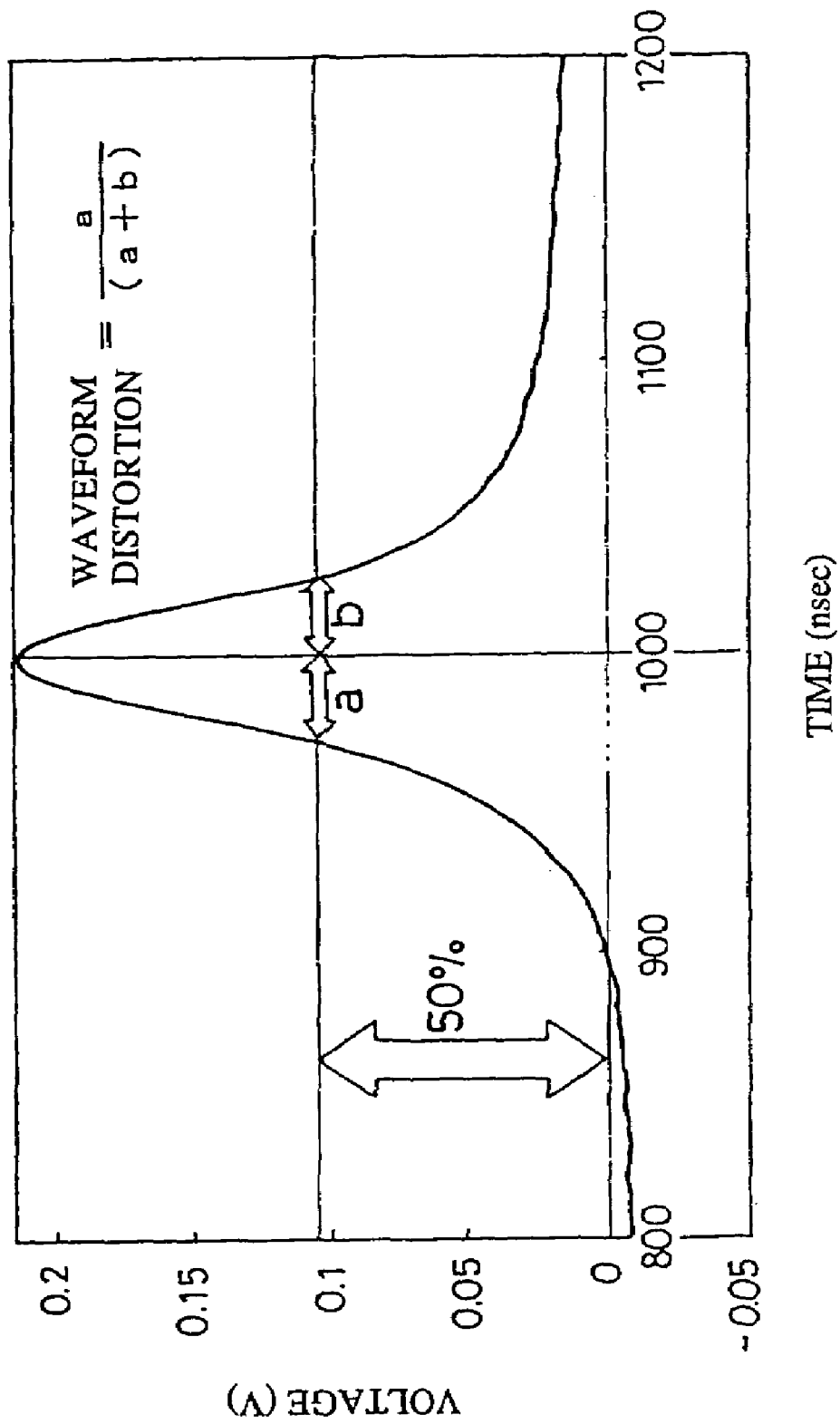
FIG. 2 is a signal waveform diagram showing that an isolated magnetic transition signal recorded on the herringbone type dual evaporated tape is reproduced.

Initially, the herringbone type dual evaporated tape having the thickness (for instance, $T_1$) of the upper magnetic layer 3 of 33 nm, the thickness (for instance, $T_2$) of the lower magnetic layer 2 of 42 nm and the total thickness of 75 nm was prepared. An isolated magnetic transition signal was recorded on the tape and reproduced by using an MR head. At this time, a reproduced waveform in a forward direction (N) was compared with a reproduced waveform in a reverse direction (R) in accordance with directions of arrow marks shown in FIG. 1. FIG. 2 shows the reproduced waveform. Assuming that a signal width of an ascending part to the top of the waveform as a boundary in a 50% level of a reproducing signal is a and a signal width of a descending part from the top of the waveform as a boundary is b, the waveform distortion of the reproduced waveform is defined by $a/(a+b)$.

In the case of the waveform shown in FIG. 2, since the signal width a is substantially the same as the signal width b, the waveform distortion is substantially 50%. In the two reverse layer type evaporated tape in which the ratio $T_1/T_2$ of the thickness of the upper magnetic layer to the thickness of the lower magnetic layer was 33/42 of about 0.786 as in this embodiment, the same reproduced waveform could be obtained both in the forward and reverse directions.

Figure 3:
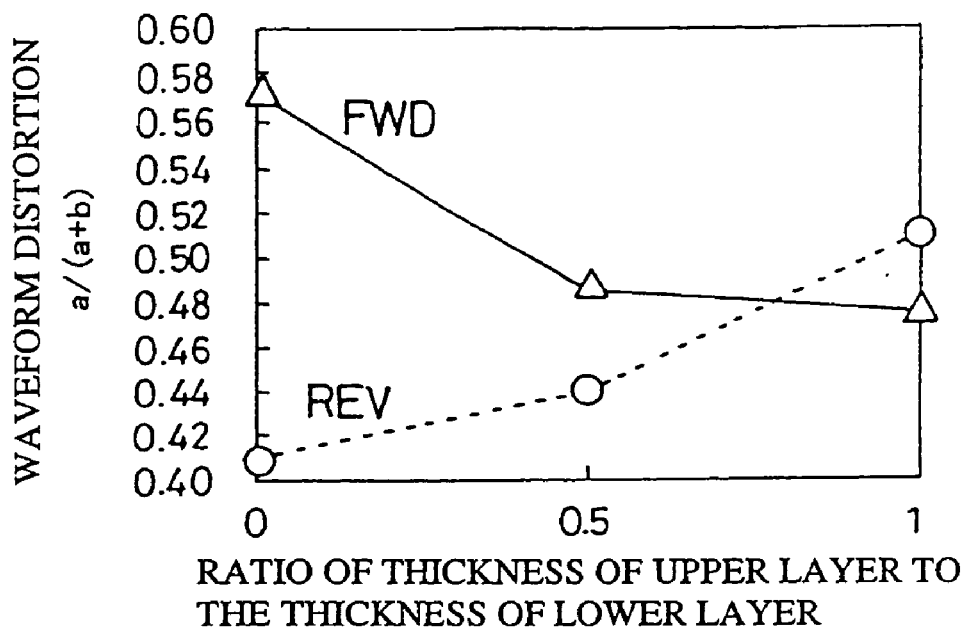
FIG. 3 is a characteristic view showing one example of the relation between the waveform distortion of a reproducing signal of the herringbone type dual evaporated tape and the ratio of the thickness of an upper layer to the thickness of a lower layer.

Then, in a two reverse layer type evaporated tape in which the total thickness of the magnetic layers 2 and 3 on the base 1 was 75 nm, a distance between two shields of MR head was 0.23 μm, and the thickness of the lower magnetic layer and the thickness of the upper magnetic layer were changed to change the ratio of the thickness of the upper magnetic layer to the thickness of the lower magnetic layer from 0 to 1, the reproduced waveforms in the forward direction and the reverse direction were observed. Thus, the relation between the waveform distortion and the ratio of the thickness of the upper magnetic layer to the thickness of the lower magnetic layer was observed. FIG. 3 shows the results thereof. In FIG. 3, triangular marks show characteristics in the forward direction and circular marks show characteristics in the reverse direction.

In FIG. 3, when the ratio of the thickness of the upper magnetic layer to the thickness of the lower magnetic layer is zero, this shows a single layer film. In this case, the original characteristics of the evaporated tape are exhibited and the waveform distortion is greatly different depending on the traveling direction. This phenomenon is caused, because the tape is vertically magnetized. Thus, in order to cancel the vertical component of the oblique magnetization, one layer is further added in the reverse direction to form a herringbone type dual magnetic layer. It is obviously recognized that the difference of the waveform distortion between the forward direction and the reverse direction is reduced in accordance with this effect.

As apparent from the above-described results, when the ratio of the thickness of the upper magnetic layer to the thickness of the lower magnetic layer for canceling the difference in the waveform distortion between the forward and reverse directions exists and is set in this area, the evaporated tape capable of obtaining a reproduced waveform without depending on the moving direction can be apparently obtained. That is, as shown in FIG. 3, the waveform distortion is located within a range of 0.46 to 0.50 when the thickness ratio is located within a range of 0.6 to 0.9. Thus, the difference of the waveform between the forward direction and the reverse direction is located within 2%. Accordingly, the waveforms in the forward and reverse directions can be regarded as the same.

The evaporated tape in which the magnetic layers form a herringbone type dual structure decreases its dependence on direction upon recording and reproducing is reduced, and accordingly, is preferably applied to a linear type magnetic recording system for recording and reproducing data in a serpentine fashion. In this structure, the ratio of the thickness of the upper magnetic layer to the thickness of the lower magnetic layer is set to 0.6 to 0.9 as in this embodiment. Thus, the reproduced waveform of the tape does not depend on a tape traveling. Thus, the magnetic recording system can be formed in which a signal process in a read/write channel can be performed by a simple one system using the same circuit both in the forward and reverse directions. Accordingly, an inexpensive system can be realized.

Therefore, in a magnetic recording and reproducing device according to the present invention, a signal processing circuit of one system is provided, and, for instance, a signal on the evaporated tape shown in FIG. 1 that has the ratio of the thickness of the upper magnetic layer to that of the lower magnetic layer located within a range of 0.6 to 0.9 is reproduced by using an MR head.

The evaporation type magnetic recording medium according to the present invention may be an evaporated tape having a back coat layer provided on the other end face of the base 1 shown in FIG. 1.

Figure 4:
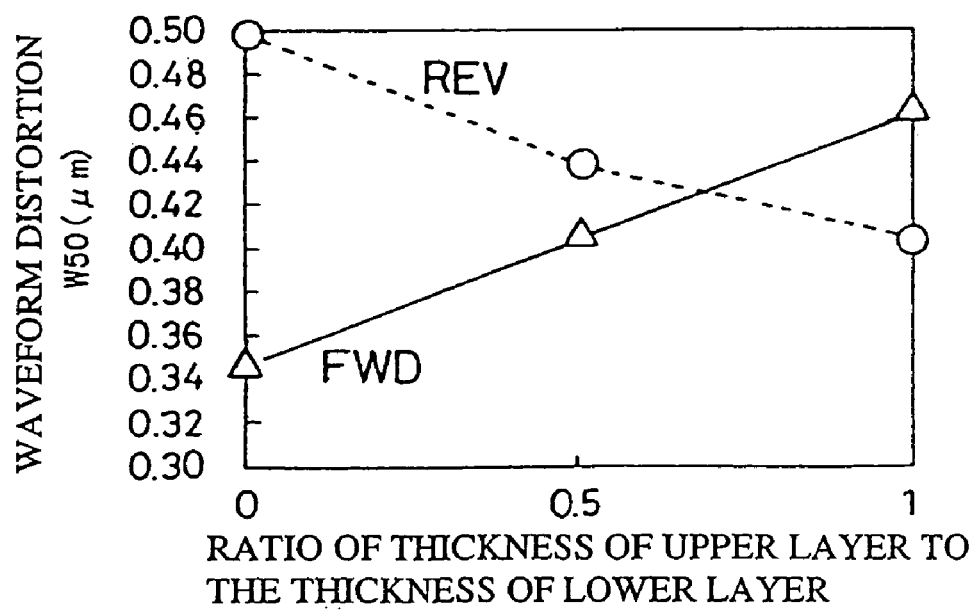
FIG. 4 is a characteristic view showing one example of the relation between the waveform width W50 of the reproducing signal of the herringbone type dual evaporated tape and the ratio of the thickness of the upper layer to the thickness of the lower layer.

Further, not only the relation between the waveform distortion and the ratio of the thickness of the upper magnetic layer to the thickness of the lower magnetic layer as described above, but also the relation between a waveform width W50 (μm) (a+b in FIG. 2) in a signal level of 50% and the ratio of the thickness of the upper magnetic layer to the thickness of the lower magnetic layer may be examined as shown in FIG. 4.

That is, in a herringbone type dual evaporated tape in which the total thickness of the magnetic layers 2 and 3 on the base 1 was 75 nm, a distance between two shields of MR head was 0.23 μm, and the thickness of the lower magnetic layer and the thickness of the upper magnetic layer were changed to change the ratio of the thickness of the upper magnetic layer to the thickness of the lower magnetic layer from 0 to 1, the reproduced waveform in the forward direction and the reverse direction was observed. Thus, the relation between a waveform width 50 in a signal level of 50% and the ratio of the thickness of the upper magnetic layer to the thickness of the lower magnetic layer was examined.

FIG. 4 shows the results thereof. In FIG. 4, triangular marks show characteristics in the forward direction and circular marks show characteristics in the reverse direction. As apparent from FIG. 4, the waveform width W50 is substantially the same in the forward direction and the reverse direction in the vicinity of the ratio of the thickness of the upper magnetic layer to the thickness of the lower magnetic layer of 0.7.

In the above-described embodiment, the evaporated tape having the herringbone type dual magnetic layers is explained. However, the present invention is not limited thereto and an evaporated tape having three or more of magnetic layers may have the same effects by setting the thickness ratio for canceling the vertical magnetization component.

FIG. 1
1. BASE
2. LOWER MAGNETIC LAYER
3. UPPER MAGNETIC LAYER

FIG. 2
ISOLATED REPRODUCED WAVEFORM
VOLTAGE (V)
TIME (nsec)
WAVEFORM
DISTORTION FIG. 3
WAVEFORM DISTORTION
RATIO OF THICKNESS OF UPPER LAYER TO THE THICKNESS OF LOWER LAYER FIG. 4
WAVEFORM DISTORTION
RATIO OF THICKNESS OF UPPER LAYER TO THE THICKNESS OF LOWER LAYER

What is claimed is:

1. An evaporation type magnetic recording medium in which data is recorded and reproduced in a serpentine fashion, said evaporation type magnetic recording medium comprising:
   a supporter;
   a first magnetic layer magnetized and formed in a first direction and;
   a second magnetic layer magnetized and formed in a second direction opposite to the first direction,
   wherein a waveform distortion difference of a waveform between a forward direction and a reverse direction is located within 2%,
   the first magnetic layer and the second magnetic layer being laminated on the supporter,
   wherein a ratio $T_1/T_2$ of a thickness $T_1$ of the first magnetic layer to a thickness $T_2$ of the second magnetic layer is located within a range of 0.6 to 0.9,
   wherein herringbone type dual evaporated tape is used for a linear type tape system.

2. The evaporation type magnetic recording medium according to claim 1, wherein at least one of the first magnetic layer and the second magnetic layer is composed of a plurality of magnetic layers.

3. A magnetic recording and reproducing device having a signal processing means of one system, wherein a signal of the evaporation type magnetic recording medium according to claim 1 is reproduced by using a magnetoresistive effect head.

4. A magnetic recording and reproducing device having a signal processing means of one system, wherein a signal of the evaporation type magnetic recording medium according to claim 2 is reproduced by using a magnetoresistive effect head.

* * * * *